United States Patent [19]

Greer

[11] 4,177,569
[45] Dec. 11, 1979

[54] TEMPLATE FOR LOCATING HOLES FOR FAUCET AND BASIN IN VANITY-TYPE SINK COUNTERS

[76] Inventor: John G. Greer, 1028 Alameda, Redwood City, Calif. 90261

[21] Appl. No.: 894,185

[22] Filed: Apr. 6, 1978

[51] Int. Cl.² .............................................. G01B 1/00
[52] U.S. Cl. ................................. 33/174 G; 33/180 R
[58] Field of Search ............ 33/174 G, 180 R; 4/192, 4/187 R, 167; 132/88.5

[56] References Cited
U.S. PATENT DOCUMENTS 2,949,798 8/1960 Berta, Jr. ............................ 33/174 G Primary Examiner—Willis Little
Attorney, Agent, or Firm—Julian Caplan

[57] ABSTRACT

A template has a base formed with a hole and a cylinder aligned with the hole and detachably connected to the base. Prior to applying cement and tile, the base is located over an enlarged hole in the counter with the cylinder projecting up. The cylinder maintains a clear hole through the cement and tile through which a faucet fits. If necessary, the cylinder may be detached from the base and removed. A single template may accommodate three cylinders for two faucets plus the spout of a water mixer. Further, a large template may fit into the space of a removed section of the counter and have a large hole for a basin plus one or more cylinders.

8 Claims, 8 Drawing Figures

TEMPLATE FOR LOCATING HOLES FOR FAUCET AND BASIN IN VANITY-TYPE SINK COUNTERS

This invention relates to a new and improved template for locating holes for faucets and basins in vanity-type sink counters. At present, a popular fixture for bathrooms is a counter usually of plywood covered with cement and tile into which fit a basin, faucets and the spout for a water mixer. Beneath the counter are cabinets. The present practice is to drill holes in the counter slightly larger than the outside diameter of water pipes, insert short sections of water pipe in the holes at the location of the faucets and spout and also cut a hole smaller than the basin. All this work is usually done by the plumber after a carpenter has installed the counter. The tile setter then applies the cement to the counter and sets the tile. The pipe stuck in the hole prevents the cement from blocking holes. After the tile has set, the plumber returns to install the faucets. If the cement and tile have been applied too thick, the faucet cannot be attached without cutting away the underside of the counter. This is a very difficult operation to perform without damaging the tile.

Accordingly, the present invention has for its principal purpose to provide means to prevent cement from filling holes cut in counters and to permit easy installation of faucets. The present device enables a very large hole as compared with the diameter of a water pipe to be cut into the counter, and this permits subsequent easy access to the faucet even though the tile and cement are quite thick.

A further feature of the invention is the device provides a guide to enable the tile man to judge the thickness of cement to be applied.

Another feature of the invention is to provide a template which accommodates a variety of patterns of faucet and spout spacings.

In one version of the invention a single template accommodates a multiplicity of faucets.

In still another modification of the invention, means is provided to locate both a basin and faucets by means of a single large template which replaces an entire counter section.

Other objects of the present invention will become apparent upon reading the following specification and referring to the accompanying drawings in which similar characters of reference represent corresponding parts in each of the several views.

Figure 1:
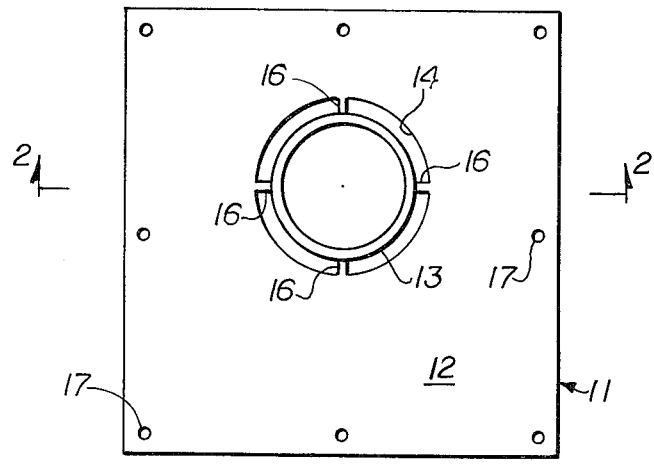
FIG. 1 is a top plan view of a template in accordance with the present invention.
Figure 2:
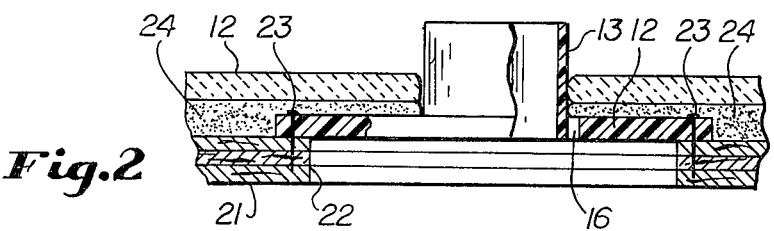
FIG. 2 is a sectional view substantially along the line 2—2 of FIG. 1 showing the template installed in a vanity counter.

Directing attention first to FIG. 1, a simplified template 11 is illustrated. Template 11 has a base 12 preferably of a plastic material and here shown to be square. A cylinder 13 is located within the perimeter of an enlarged hole 14 in base 12 being connected to the base by a plurality of integral connectors 16 (here shown as four in number). Nail holes 17 may be formed in base 12 near the outer margins thereof or the holes 17 may be formed by the user located as required.

In the use of the template 11, the first step is to form a hole 22 in the plywood counter 21. A simple way to locate the hole 22 is to position the base 12 on the counter 21 in a location so that the cylinder 13 is in alignment with the eventual position of the faucet. A line is then drawn around the four sides of the base 12 and the hole 22 is sawed in the counter having a size less than the size of the base. Nails 23 through holes 17 nail the base 12 to the counter 21 overlying the hole 22. Hence the hole 22 cannot be blocked.

Figure 3:
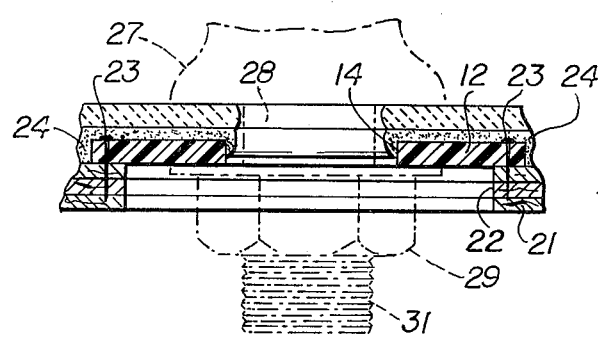
FIG. 3 is a view similar to FIG. 2 showing the cylinder of a template knocked out and a faucet installed.

The tile setter then applies a layer of cement 24 over the counter 21 and the base 12 up to the cylinder 13 and then sets the tile 26 over the cement 24. The cylinder 13 functions as a guide to the tile man as to the proper thickness of cement 24 and also prevents the cement from filling the hole 14. In many installations, the cylinder 13 may be maintained in place. However, if it projects too high, merely by tapping the top of the cylinder 13 with a hammer, the connectors 16 are fractured, permitting the cylinder to drop out, as shown in FIG. 3. To install a faucet 27, the valve body or hold-down nipple 28 thereof is placed through the hole in the tile 26 and the cement 24 and the hole 24 in the base 12. Nut 29 is then threaded over the threaded end 31 of valve body or hold-down nipple 28 and drawn tight against the underside of base 12, drawing the faucet 27 down tightly against the top of the tile 26. Since the hole 22 is quite large, easy access to the nut 29 with a faucet wrench is provided. It is unnecessary, therefore, to have to cut away the underside of the counter 21 if the tile man has placed too much cement 24 on the counter.

Figures 4, 5:
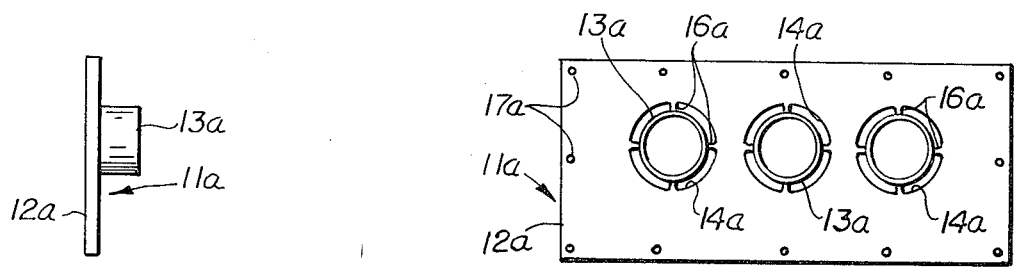
FIG. 4 is a view similar to FIG. 1 of a modification in which there are three cylinders.
FIG. 5 is an end elevation of the modification of FIG. 4.

FIGS. 4 and 5 show a modification wherein there is a cylinder 13a upstanding from the base 12a and also two other cylinders 36 and 37 positioned in holes 14a and held in place by connectors 16a. The cylinders 13a, 36 and 37 provide for the hot and cold water faucets and the spout of the water mixer or the pop-up rod respectively. It will be understood that the number of cylinders and the pattern thereof is subject to variation.

Figure 6:
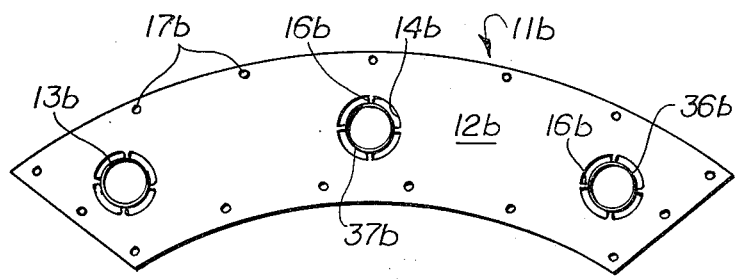
FIG. 6 is a view similar to FIG. 4 showing an arcuate pattern of cylinders.

Thus, as shown in the modification of FIG. 6, the pattern of the cylinders 13b, 36b and 37b is arcuate.

Figure 7:
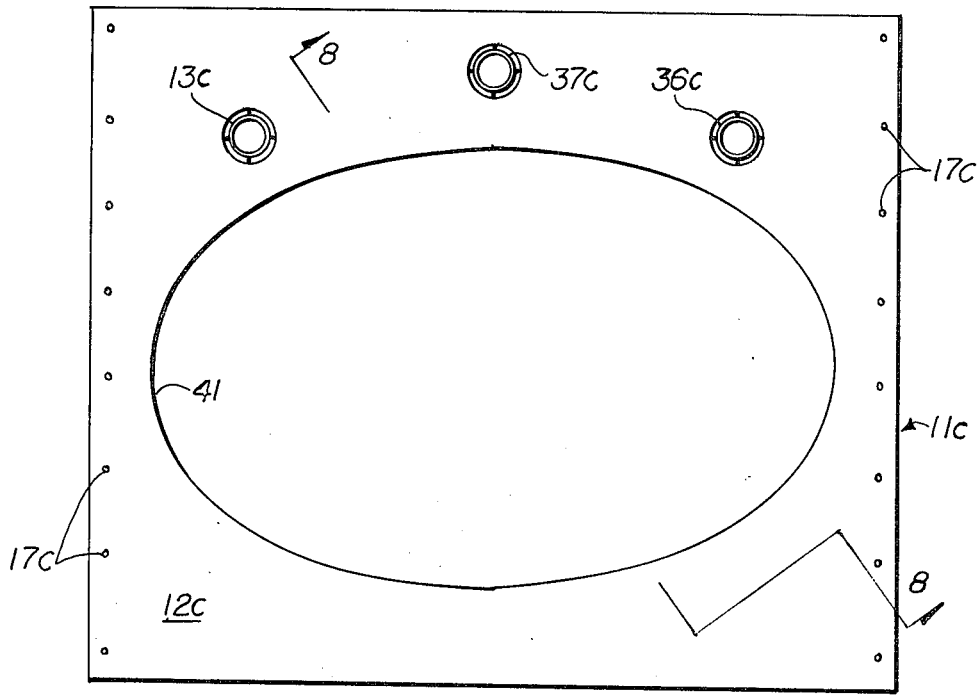
FIG. 7 is a top plan view of a modified template which provides means for locating both the basin and faucets.
Figure 8:
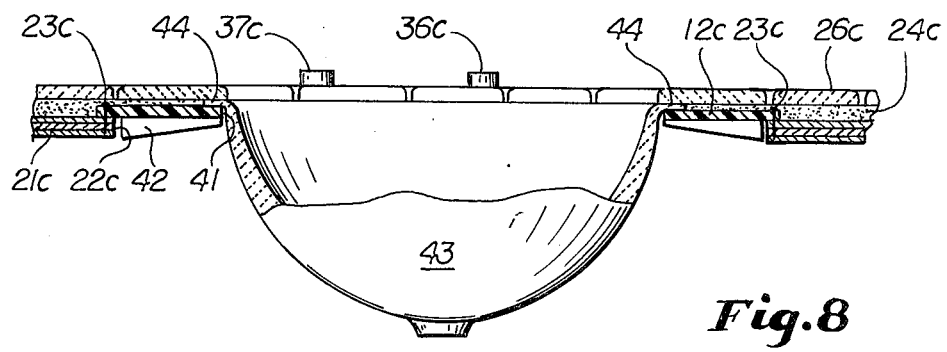
FIG. 8 is a sectional view substantially along the line 8—8 of FIG. 7 showing the template and a basin installed in a counter.

FIGS. 7 and 8 show a further modification. In this modification, the template 11c is considerably enlarged over that of the preceding modifications and is intended to replace an entire section of counter 21c. A large hole 41 corresponding to the shape of the basin which is installed in the counter is cut into the base 12c or, preferably, precut at the factory. Because of the weight which the base 12c must support, gussets 42 are preferably integrally formed therein to strengthen the base 12c. Cylinders 13c, 36c, 37c in any desired pattern are located in the base 12c adjacent the margin of the hole 41.

In use of the device in FIGS. 7 and 8, a hole is cut in the counter 21c and the template base 12c is nailed to the top thereof by nails 23c. The flange 44 of basin 43 is then set on top of the base 12c with the basin 43 extending down through the hole 41. Cement 24c and tile 26c are then laid. The faucets and spout may be installed in the hole surrounding cylinders 13c, 36c, 37c as in the preceding modification.

In many respects, the modifications of FIGS. 4, 6 and 7 resemble those of preceding modifications, and the same reference numerals followed by the subscripts a, b and c, respectively, are used to designate corresponding elements.

What is claimed is:

1. A template for use in combination with a sink counter to lay tile on said sink counter or vanity surrounding a first hole in the counter vanity through which a faucet is subsequently to be installed, said template further being used to aid the tile setter in locating the tile and insuring that said first hole is not obstructed by cement and/or tile, said template comprising, a base larger than said first hole and having means associated therewith for permanently securing said base to said counter approximately concentric with said first hole, a cylinder, and means at least temporarily securing said cylinder to said base upstanding from the surface of said base opposite said counter, said base being formed with a second hole substantially smaller than said first hole and approximately concentric with said cylinder.

2. A template according to claim 1 in which said means is detachable.

3. A template according to claim 1 in which said hole is larger than said cylinder and said means comprises a plurality of frangible members interconnecting the margin of said hole with said cylinder.

4. A template according to claim 1 which further comprises at least one third hole in said base and at least one third cylinder approximately concentric with said third hole.

5. A template according to claim 1 in which said base is substantially larger than said first-mentioned hole, said base being formed with an enlarged aperture shaped to receive the top rim of a basin, said hole being located spaced from but adjacent said aperture.

6. A template according to claim 5 which further comprises reinforcing gussets extending from said aperture to the margins of said base.

7. The combination of claim 5 which further comprises a basin having a top peripheral flange set into said aperture, said flange resting on said base around said aperture.

8. The combination of claim 1 which further comprises cement over said counter and said base and surrounding said cylinder and tile secured to said cement surrounding said cylinder.

* * * * *